United States Patent [19]

Howarter et al.

[11] Patent Number: 5,280,625
[45] Date of Patent: Jan. 18, 1994

[54] COMMUNICATION SYSTEM AND METHOD FOR LINKING DATA TERMINALS AND THEIR HOST COMPUTERS THROUGH A SATELLITE OR OTHER WIDE AREA NETWORK

[75] Inventors: David R. Howarter, Del Mar, Calif.; Dennis Conti; Dennis Mager, both of Monrovia, Md.; Nurit Yehushua, San Diego, Calif.

[73] Assignee: Hughes Aircraft Company, Los Angeles, Calif.

[21] Appl. No.: 904,733

[22] Filed: Jun. 26, 1992

[51] Int. Cl.⁵ .............................................. G06F 13/00
[52] U.S. Cl. .................................................. 395/200
[58] Field of Search .................. 395/200; 364/919.3, 364/919.4, 932.1, 479, 918; 235/380, 381

[56] References Cited

U.S. PATENT DOCUMENTS

| | | | |
|---|---|---|---|
| 4,517,412 | 5/1985 | Newkirk et al. | 379/123 |
| 4,567,359 | 1/1986 | Lockwood | 235/381 |
| 4,695,880 | 9/1987 | Johnson et al. | 358/86 |
| 4,697,072 | 9/1987 | Kawana | 235/380 |
| 4,700,055 | 10/1987 | Kashkashian | 235/379 |
| 4,727,243 | 2/1988 | Savar | 235/379 |
| 4,935,608 | 6/1990 | Tanaka | 235/375 |
| 4,947,028 | 8/1990 | Gorog | 235/381 |
| 4,970,655 | 11/1990 | Winn et al. | 364/479 |
| 5,173,594 | 12/1992 | McClure | 235/380 |
| 5,175,416 | 12/1992 | Mansvelt et al. | 235/379 |

Primary Examiner—Dale M. Shaw
Assistant Examiner—Moustafa Meky
Attorney, Agent, or Firm—Gordon R. Lindeen, III; William J. Streeter; Wanda Denson-Low

[57] ABSTRACT

A satellite wide area communications network (10) includes a remote transmitter/receiver (28A) that is coupled through a modem unit (30A) to multiple card readers (12A-1 to 12A-n). A master transmitter/receiver (26) is satellite linked to the remote transmitter/receiver and is coupled through a central packet network (16) to multiple host computers (18-1 to 18-j). A network host computer address is determined for each transaction card inserted in the card readers, and the network address is processed to establish a direct link to the host computer for the card through the modem unit, the satellite link (22A, 20, 24), and the central packet network.

34 Claims, 8 Drawing Sheets

COMMUNICATION SYSTEM AND METHOD FOR LINKING DATA TERMINALS AND THEIR HOST COMPUTERS THROUGH A SATELLITE OR OTHER WIDE AREA NETWORK

BACKGROUND OF THE INVENTION

The present invention relates to wide area communication systems and more particularly to systems in which each of multiple data terminals, such as point-of-sale terminals in the form of transaction or credit card readers, is to be linked to its host computer selected from a group of multiple computers.

Wide area business communication networks are employed to connect one or more centralized data/communication centers to multiple remote stations or offices to which data and/or other communication links need to be established. For example, a private communication system may be established as a wide area network in which a company data center is linked with branch offices of the company across a wide geographic area.

The wide area network (WAN) may have any of various system designs. Thus, point-of-sale terminals may be interfaced with the public telephone system thereby establishing a wired terrestial wide area network. A more technologically advanced and often more commercially advantageous network is one in which satellite communications provide the communication links.

One satellite wide area network (SWAN) that is commercially available is called the Integrated Satellite Business Network TM supplied by Hughes Network Systems, Inc. In the Hughes SWAN, a hub station is located at a central location and a very small aperture terminal called a Personal Earth Station TM is located at each remote site.

In the prior art, point-of-sale terminals such as transaction card readers have used the public telephone network to gain access to one of possibly several host computers. A telephone call is placed from the card reader either automatically upon a credit, cash or other card being swiped through the reader, or manually by the user entering dial digits through a keypad.

Card readers normally have an integral or external modem that provides an interface to a traditional telephone circuit. As a result, connection of card readers to a WAN through a digital interface, such as an RS232 interface, has been problematic. Thus, the card-reader modem expects to interface a telephone circuit while the WAN equipment expects to interface digital terminal equipment (DTE).

Moreover, some data communication networks for point-of-sale terminals such as card readers can connect each point-of-sale terminal in the system to a predesignated host computer for ultimate exchange of data between the card reader and the specific host computer that contains data for a card being read by the card reader. As a result, access to data bases on host computers other than the predesignated host computer is prohibited or made difficult. For example, in such networks, access of a point-of-sale terminal is restricted to only one provider of credit card verification services through the predesignated host computers. In addition to restricting data base services, such networks have processed transactions to link with their respective host computers with a requirement for excessive and costly computer hardware and with excessive communication network loading and excessive processing cost.

The present invention accordingly is directed to linking data terminals or point-of-sale terminals such as card readers having an integral or external modem to a WAN without use of telephone circuitry and thereafter to a host computer through the WAN with improved efficiency and economy.

SUMMARY OF THE INVENTION

A wide area communication network comprises central network means for establishing a data link to any of multiple host computers each of which has resident data related to particular remote data service requests. At least one remote network terminal means has a plurality of data terminals for initiating data service requests.

Each of the data terminals has means for detecting a host computer address from an input data service request and for generating an output data signal representative of the host computer address for transmittal through the wide area communication network. Circuit means are provided for receiving any host computer address signal from the data terminals and for directing a representation of a received host computer address signal to the central network means to establish a direct network link to the addressed host computer.

The circuit means further has means for demodulating data being sent from a connected data terminal to the addressed host computer through the linking means and the central network means after the direct network link is established. The circuit means additionally has means for modulating data being sent from the addressed host computer through the central network means and the linking means to the connected data terminal after the direct link is established.

BRIEF DESCRIPTION OF THE DRAWINGS

The accompanying drawings, which are incorporated in and constitute a part of this specification, illustrate one embodiment of the invention and together with the description provide an explanation of the objects, advantages and principles of the invention. In the drawings.

DESCRIPTION OF THE PREFERRED EMBODIMENT

Figure 1:
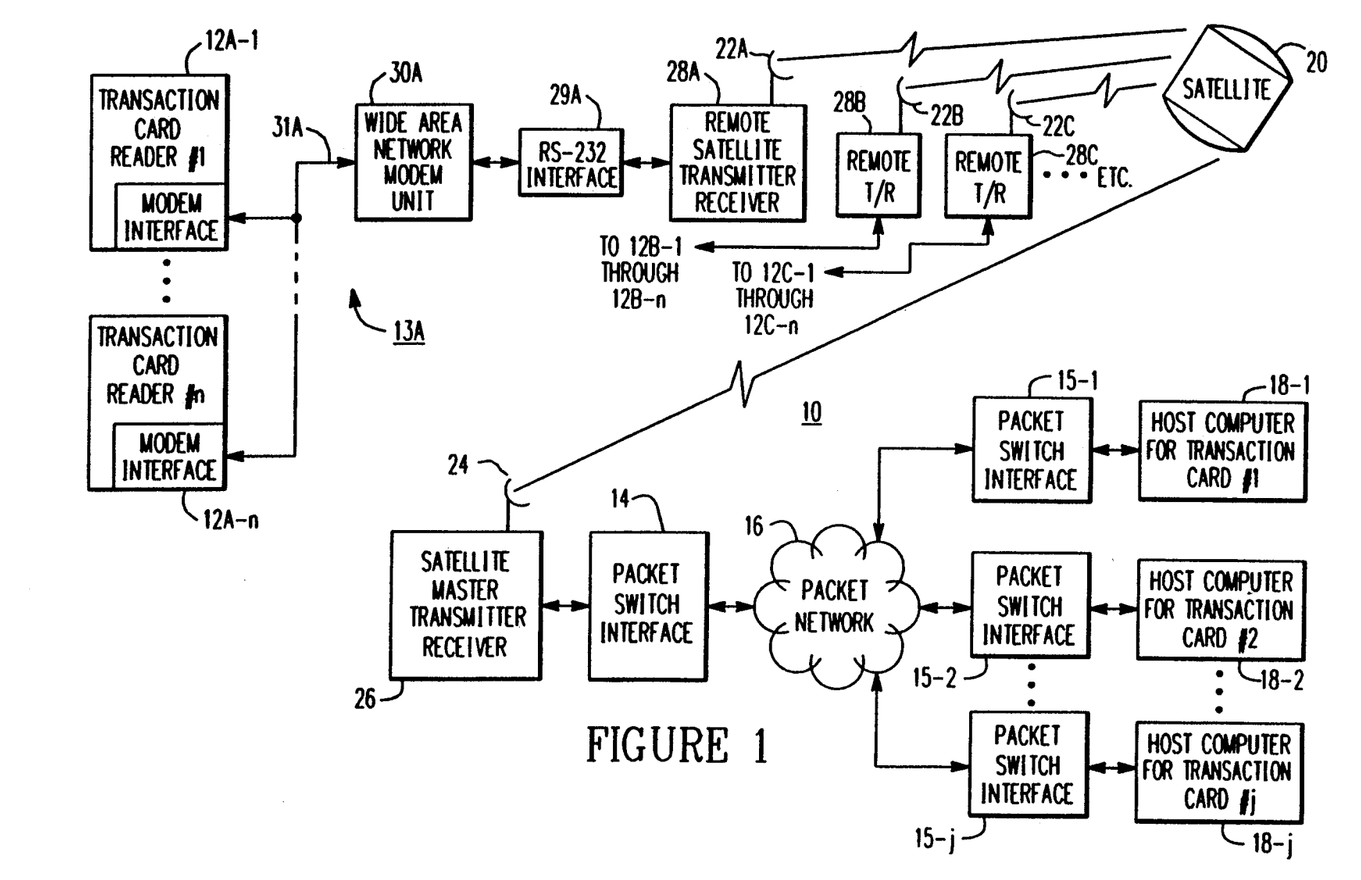
FIG. 1 shows a functional block diagram for a satellite wide area network in which data terminal or point-of-sale terminal transactions are processed in accordance with the invention.

A wide area communications system or network 10 shown in FIG. 1 is structured in accordance with the invention to provide bidirectional data communication between any of multiple remote data terminals and any of multiple centrally located host computers which contain data related to operations or transactions occurring at the remote data terminals. Each remote operation or transaction has associated with it a specific host computer in which related data is resident.

In the preferred embodiment, the data terminals are point-of-sale terminals provided in the network 10 in the form of card readers including readers 12A-1 through 12A-n that are provided in a remote subsystem 13A at a particular remote location RA, such as in a particular retail store location operated by a chain retailer. In the general case, additional card readers 12B-1 through 12B-n, 12C-1 through 12C-n, etc. may be located in additional remote store locations RB, RC, etc. Magnetically encoded transaction cards that may be inserted into the card readers include credit cards, cash cards, debit cards, ATM cards, check guarantee cards, etc. Other types of point-of-sale or other data terminals that may be employed include cash registers, facsimile terminals, check readers, etc.

As already indicated, centralized data service is provided by multiple host computers interconnected in a central computer network portion of the wide area network 10. Thus, a conventional packet switch interface 14 at a central or master location operates through a conventional packet network 16 and respective packet switch interfaces 15-1 and 15-2 through 15-j to establish respective data links to host computers 18-1, and 18-2 through 18-j.

Generally, in packet input operations for the packet network, a packet switch interface functions to receive data packets from multiple source lines and provide switching operations that route the packets over a limited number of common lines in the packet network. In packet output operations, the packet switch interface operates in reverse, namely it receives data packets from the limited number of common lines in the packet network and distributes them over multiple destination lines.

Only the network elements provided at the remote location A are illustrated in FIG. 1 and will be described in greater detail. The other remote locations have generally similar network elements and accordingly need not be further described.

In the wide area network 10, the centrally located host computers 18-1, etc. and the remote card reading locations are preferably integrated for data communications by means of a conventional satellite communications link provided through a satellite 20. Thus, in the preferred embodiment of the invention, the wide area network 10 is a satellite wide area network.

Remote satellite transmitter/receiver stations are provided with respective antennae 22A, 22B, 22C, etc. for satellite linkage. The central location is provided with a master antenna 24 for satellite linkage.

A satellite master transmitter/receiver unit 26 is coupled to the antenna 24 to send signals to the satellite 20 from the packet switch interface 14 and to receive signals from the satellite 20 for coupling to the packet switch interface 14.

Figure 8:
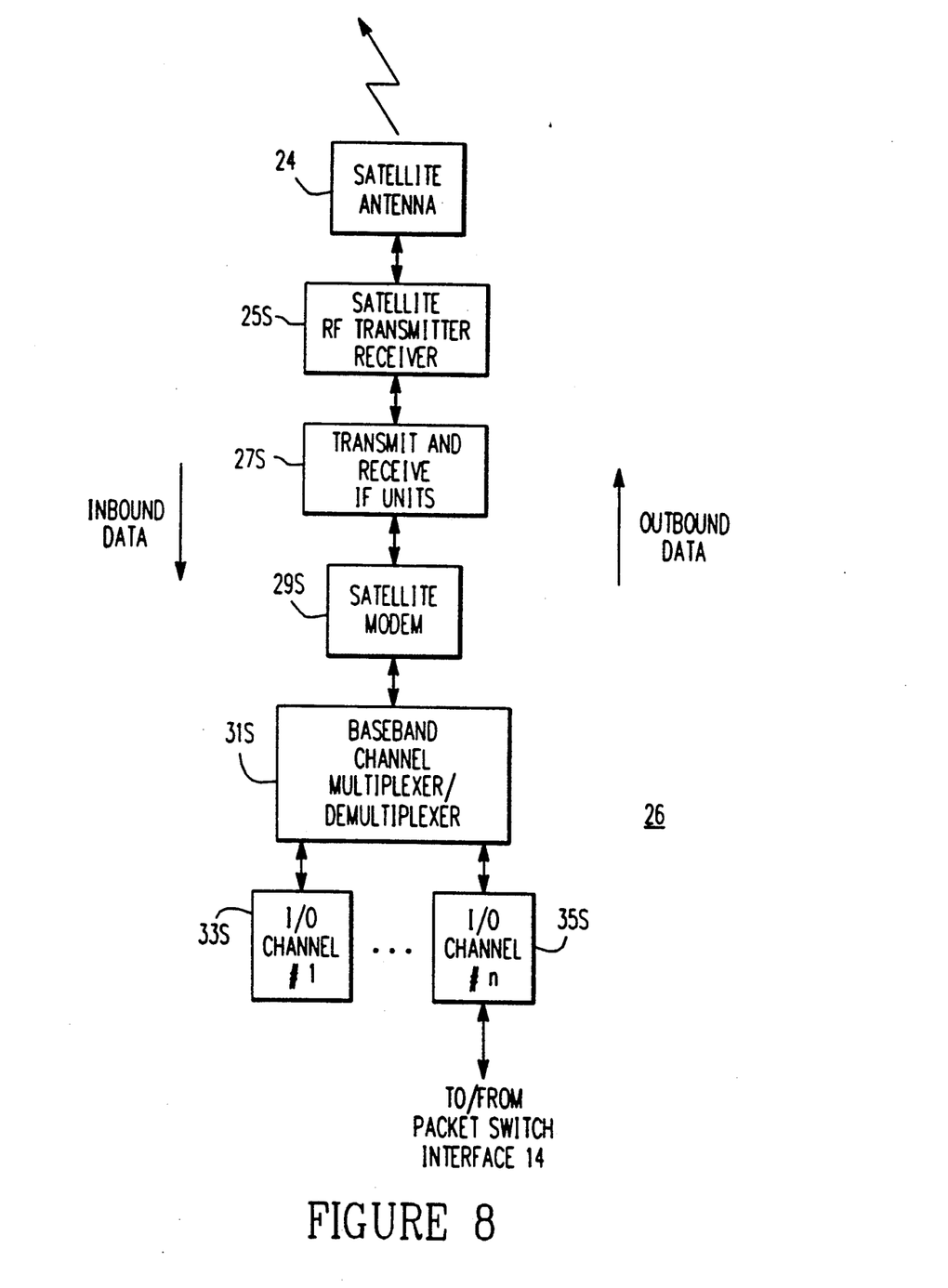
FIG. 8 shows in greater detail a functional block diagram for a master satellite transmitter/receiver employed in the WAN of FIG. 1.

As shown in greater detail in FIG. 8, the master satellite unit 26 includes an RF transmitter/receiver 25S that receives radio frequency signals from the satellite and downconverts them to a lower intermediate frequency (IF). IF signals received from a satellite modem 29S are upconverted to the RF frequency and sent to the satellite antenna 24.

Transmit/receive IF units 27S receive inputs from the satellite transmitter/receiver 25S and downconvert them to a lower IF frequency for processing by the satellite modem 29S. Signals from the satellite modem 29S are upconverted to a higher IF frequency for application to the satellite RF transmitter.

The satellite modem 29S receives incoming signals from the IF receiver unit and demodulates them to baseband data signals. Outgoing baseband data signals to be transmitted are modulated in a predetermined modulation format and sent to the transmit IF unit.

A baseband channel multiplexer/demultiplexer 31S receives an input data stream from the modem 29S. The data stream contains data from the remote terminals in a multiplexed data format. The demultiplexer segregates the data into separate channels. Data from some card transactions is routed to an input/output channel 35S. Another I/O channel 33S provides service for other transactions (not shown). Other I/O channels (not shown) may also be provided for other communication requirements.

For outbound data, the multiplexer portion of the unit 31S receives data from the I/O channel 35S and merges it with data from other I/O channels with use of a satellite packet format thereby forming a stream of data for satellite transmission.

The I/O channel 35S converts data received from the baseband unit 31S to the required I/O voltage levels and sends the voltage-converted data to the packet switch interface 14. Outgoing data from the packet switch interface 14 is converted to internal voltage levels and sent to the baseband unit 31S for multiplexing.

In accordance with the present invention, means are provided for generating an address of the host computer for a transaction card inserted in any of the card readers 12A-1 through 12A-n in response to data detected from the inserted card or inputted manually by the keypad operator. Preferably, each card reader is provided with such means for generating the host computer address.

A well-defined standard for establishing calls in an X.25 network is called X.28. Another standard X.121 further defines the addressing scheme to be used in X.28 call establishment schemes.

The card readers 12A-1 through 12A-n are preferably coupled to a remote satellite transmitter/receiver 28A through a wide area network (WAN) modem unit 30A. The WAN modem unit 30A is coupled to the remote satellite transmitter/receiver 28A through a digital interface, in this preferred case, an asynchronous RS-232 interface 29A. The interface 29A is shown as a separate block in FIG. 1. However, the RS-232 circuitry is provided partly in the WAN modem unit 30A and partly in the transmitter/receiver unit 28A.

The RS-232 interface 29A is a conventional interface system that converts data signals at one voltage level to corresponding data signals at another voltage level in accordance with EIA standards. The interface 29A accordingly enables transmittal of data signals between the WAN modem unit 30A and the satellite transmitter/receiver which operate at different signal voltage levels.

The transaction card readers are coupled to the WAN modem unit 30A preferably through a hard wire connection 31A instead of a public telephone company interface which is conventionally used in prior art interfacing of card readers. The WAN modem unit 30A is instrumental in directly linking an interfaced card reader to the specific host computer identified by the address generating means from an inserted transaction card.

In system operation in accordance with the invention, the address of the host computer for any transaction card inserted into a card reader at the remote location A is determined and the card reader is compatibly coupled to a WAN without the use of telephone circuitry and thereafter is directly linked to the host computer to provide better system operation, expanded access to host computers for transaction card verification services, and greater system economy with lower cost processing of card transactions as compared to the prior art.

In other applications of the invention, the wide area network can be embodied without use of a satellite linkage. In that event, the satellite transmitter/receivers 26 and 28A are omitted and the WAN modem 30A, is directly connected to the packet switch interface through appropriate hardware such as packet assembler/disassembler and public telephone network circuitry.

THE DATA TERMINAL—A TRANSACTION CARD READER

Figure 3:
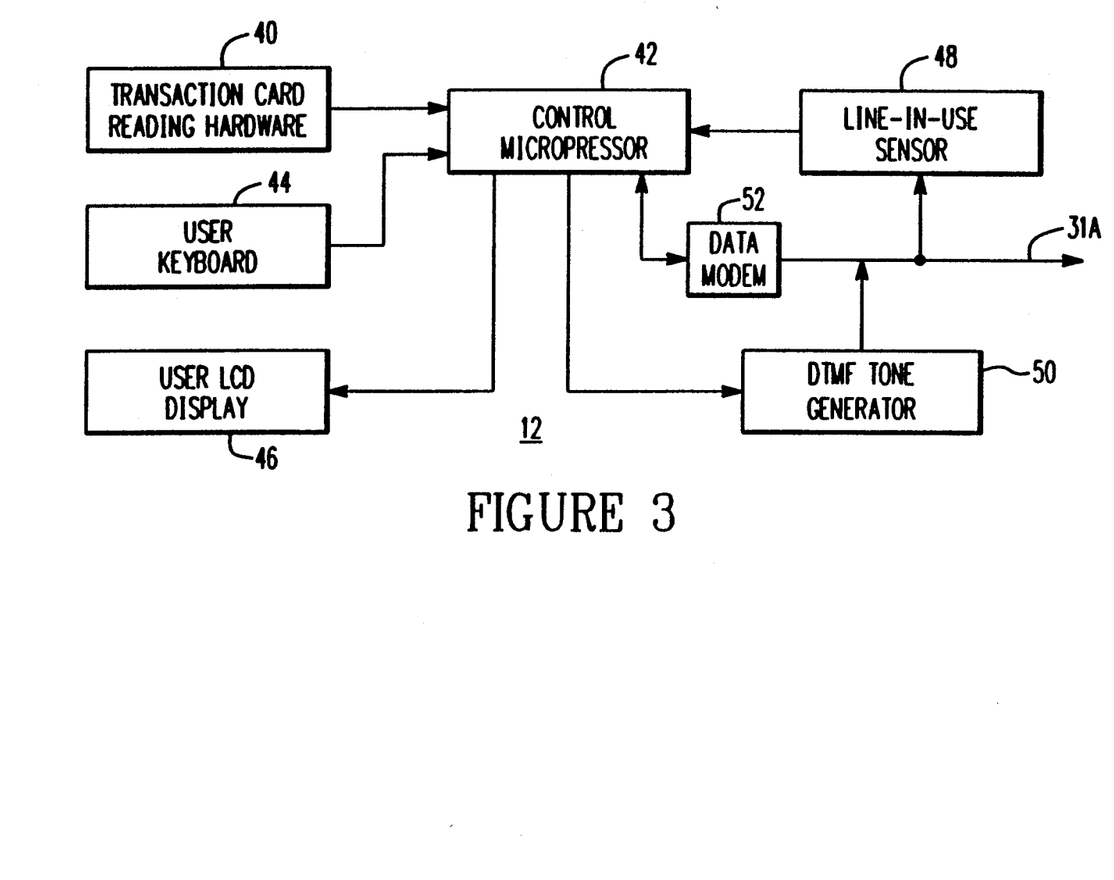
FIG. 3 shows in greater detail a functional block diagram for a transaction card reader employed as a point-of-sale terminal in the WAN of FIG. 1.

A transaction card reader 12 having conventional hardware is illustrated in greater detail in FIG. 3. Thus, data from an inserted transaction card is magnetically read by transaction card reading hardware 40 and applied as an input to a microprocessor 42. In operation, the user swipes the transaction card through the reader 12, and the magnetic coding on the card is translated into voltage levels that represent the encoded card data.

A user keyboard 44 provides for keyed entry of transaction or other data into the microprocessor 42. For example, card data may be manually entered by key strokes if the magnetic stripe on a particular card is defective. Further, the operator uses the keyboard to enter the total amount of a transaction. If the card reader is part of a point-of-sale terminal (not shown), the total transaction amount may be created by summing all of the transactions entered by the operator.

A user alphanumeric LCD display 46 generates instruction messages for the operator, such as "enter transaction amount".

The microprocessor 42 is generally programmed to translate and transfer data and to control other card reader circuitry. As illustrated by a flow chart in FIG. 7, a programmed procedure for the card reader microprocessor 42 is started and then waits in a block 162 for a transaction request. After a request is entered, a block 164 displays a command "ENTER AMOUNT". The amount is entered and read and stored by a block 166.

Figure 7:
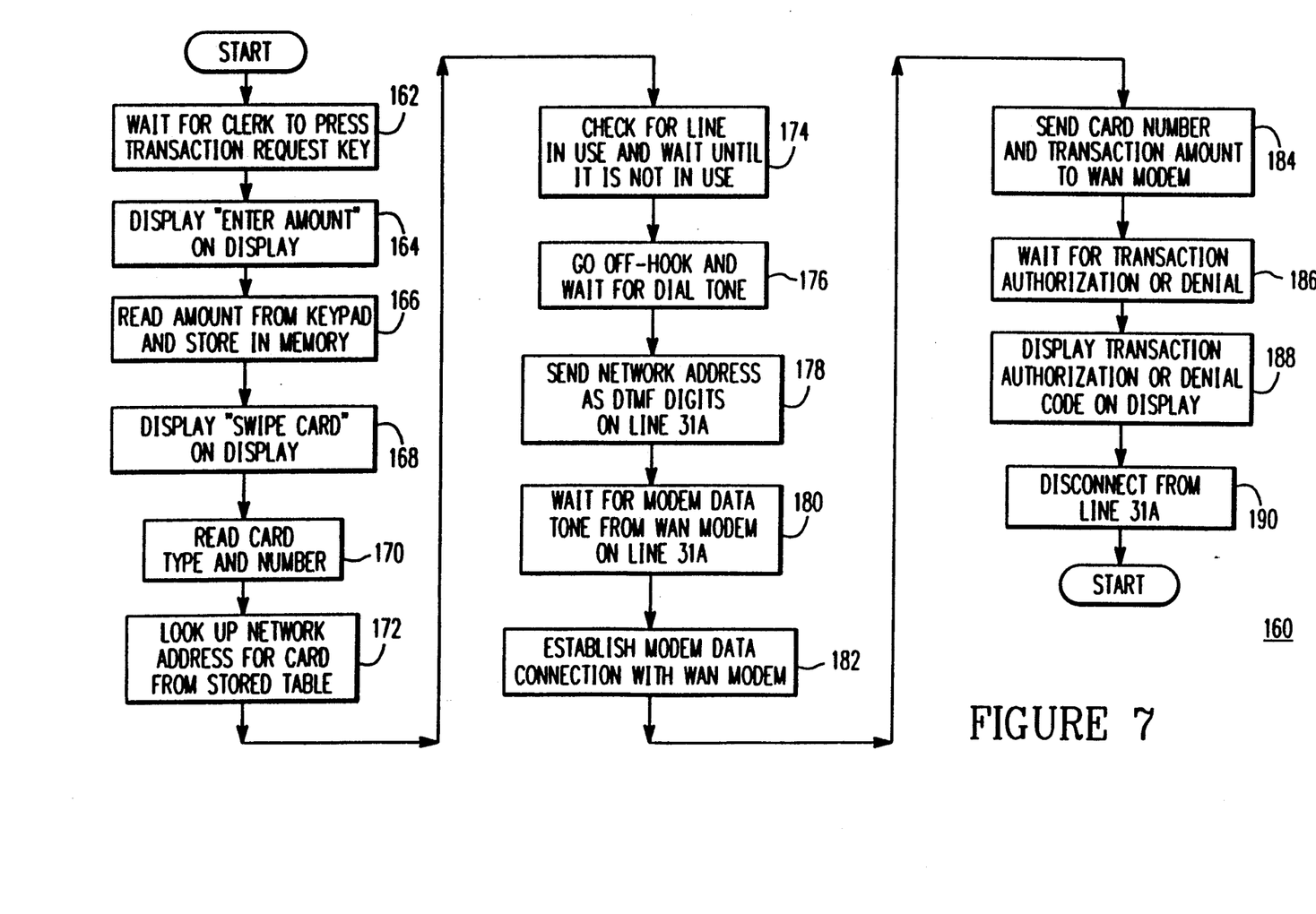
FIG. 7 shows a flow diagram for programmed procedures employed by the card reader detailed in FIG. 3.

Next, a command "SWIPE CARD" is issued and displayed by a block 168, and a block 170 then reads and stores the card type and number. The microprocessor 42 preferably has stored in its memory a lookup table that lists the network address (or digit signals representing the host computer) of host computers in the network indexed against host-computer identification data received from input cards. A block 172 accesses the stored table to determine the host-computer network address from magnetic input data for the current transaction.

A check is made by a block 174 to determine whether the line 31A is in use, and, if so, a wait is initiated for line availability. Once line use is available, a block 176 sets the reader off-hook and waits for a dial tone.

In a block 178, the determined network address for the host computer having data to service the current transaction is preferably directly represented by and sent as sequential digit signals in the form of DTMF tone signals to the WAN modem unit 30A on the line 31A. In other applications of the invention, pulse digits may be employed. As considered elsewhere herein, the WAN modem unit 30A processes the network address for the identified host computer and completes a direct data link to the identified host computer.

Another block 180 waits for a modem data tone from the WAN modem unit 30A, and, once the data tone is detected, a block 182 makes a modem data connection with the WAN modem unit 30A. The WAN modem unit 30A functions like a traditional telephone central office unit and therefore simulates one or appears to be one to the card reader.

Data transfers are then executed by the procedure 160. Thus, a block 184 sends the current card number and transaction amount to the WAN modem unit 30A, which in turn transmits the same data through the direct satellite link to the host computer for the current transaction.

A wait is set up by a block 186 for authorization or denial of the current transaction from the host computer providing the data service. A block 188 displays the authorization or denial code once it is received. Finally, a disconnect is made from the line 31A and the current run of the procedure 160 is ended by a block 190.

Since commercially available card readers are normally connected to a telephone line, such readers may not start transmitting until a dial tone is detected. Therefore, the WAN modem unit 30A is structured to supply a dial tone. In the preferred embodiment, the modem unit 30A senses when a card reader has gone "off-hook" and then transmits dial tone while waiting to receive DTMF tones. Alternatively, the modem unit 30A may be "off-hook" at all times and transmit dial tone until it receives DTMF tones.

The WAN modem unit 30A receives no ringing voltage to indicate an incoming call, but determines that a call has been initiated by the sensing line voltage changes or, alternatively, by receipt of Dual Tone Multi-Frequency (DTMF) tones from the card reader. In the preferred embodiment, generated DTMF tone signals directly represent a number corresponding to a host-computer network address. Alternatively, in the absence of a lookup table for host-computer network addresses in the card reader, sequential digit signals representing a telephone number determined by translating an identification number from the input card data are transmitted to the modem unit 30A which employs a stored lookup table to generate a host-computer network address.

A line-in-use sensor 48 inhibits output operation of the microprocessor 42 when the card reader line 31A is in use by another card reader. When the line 31A is available, a DTMF generator 50 is controlled by the microprocessor 42 to generate DTMF tone signals that define the address of the host computer for an inserted transaction card.

Data transmitted by the WAN modem unit 30A is routed through a wide area network to one of the host computers. Preferably, the host computer address received from one of the card readers is transmitted at the initiation of a data transmission. Thus, as previously indicated, the active transaction card reader is preferably programmed with "telephone numbers" which in actuality are representations of the numerical digits of the host computer addresses preferably in the conventional X.121 format. Alternatively, the programmed telephone numbers are translated by the WAN modem unit 30A into the X.121 format.

The card reader transmits digit signals which respectively represent digits as DTMF tones (or electrical pulses) at the beginning of a transaction, preferably before data carrier connectivity is established. That is, the card reader first transmits what appears to be a telephone number and it then waits for the WAN modem unit 30A to establish a normal modem connection. The WAN modem unit 30A decodes the DTMF digits and translates them into a properly formatted X.28 command.

As an alternative, the card readers at a particular location may operate with pulse dialing. In that event, appropriate modifications are made in the preferred embodiment to accommodate the embodiment operation to pulse signals in place of DTMF tones.

Once a connection is established between the card reader and the host computer for an inserted transaction card, a data modem 52 operates under microprocessor control to modulate card reader data from the microprocessor 42 onto the line 31A and to demodulate data from line 31A for processing by the microprocessor 42. Generally, the data represents the credit card number information, the transaction amount, and verification information.

THE REMOTE SATELLITE TRANSMITTER/RECEIVER

Figure 4:
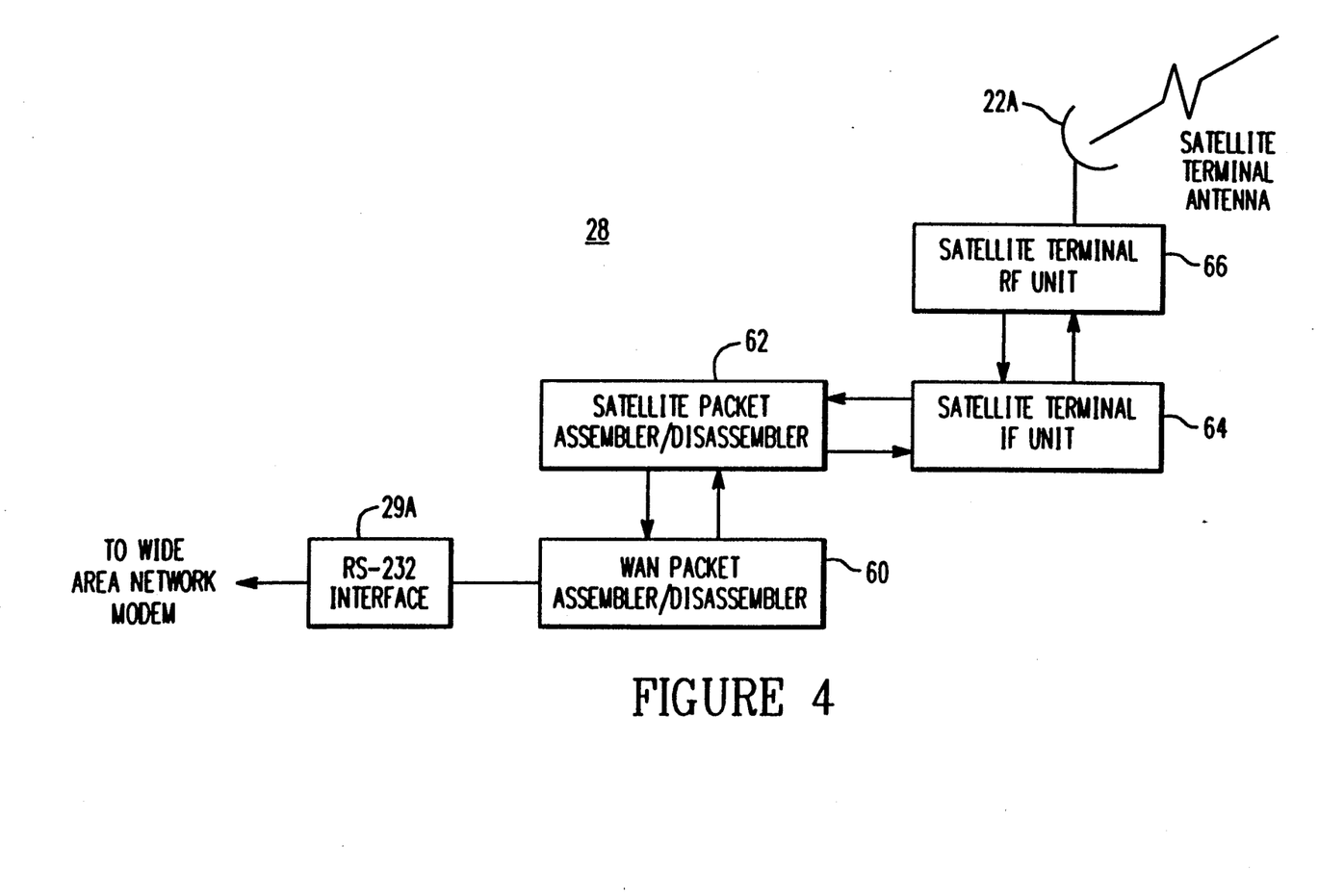
FIG. 4 shows in greater detail a functional block diagram for a remote satellite transmitter/receiver employed in the WAN of FIG. 1.

As shown in FIG. 4, the remote satellite transmitter/receiver 28 communicates with the WAN modem 30A through the RS-232. interface circuitry 29A which, as previously indicated, is physically included in the units 28A and 30A and converts data signals between internal and external voltage levels.

A WAN data packet assembler/disassembler unit 60 generally receives input data characters from the WAN modem 30A and sets up a WAN network link. The received data is translated into an outgoing WAN packet format that is passed to a satellite packet assembler/disassembler 62.

The WAN data packet assembler/disassembler 60 also receives incoming data packets from the satellite packet assembler/disassembler 62. The WAN formatting is stripped from the received packets and the data characters are passed through the RS-232 interface 29A to the WAN modem 30A.

The satellite packet assembler/disassembler 62 translates outgoing WAN packets received from the WAN unit 60 into a satellite packet format which is a special format used to transport data from one end of the satellite link to the other end of the link.

The translated outgoing packets are generated and applied to a satellite terminal IF unit 64 with the timing needed for transmission over the satellite network. When incoming packets are received from the satellite network, the unit 62 essentially operates in a manner reverse to the manner just described.

The satellite terminal IF unit translates outgoing baseband digital data to modulated IF data, and demodulates incoming IF data into baseband satellite data packets. A satellite terminal RF unit 66 receives outgoing IF data, converts it to RF data and couples the RF data to the antenna 22A. Reverse processing is employed by the RF unit 66 for incoming RF data received from the antenna 22A.

THE WIDE AREA NETWORK MODEM

Figure 2:
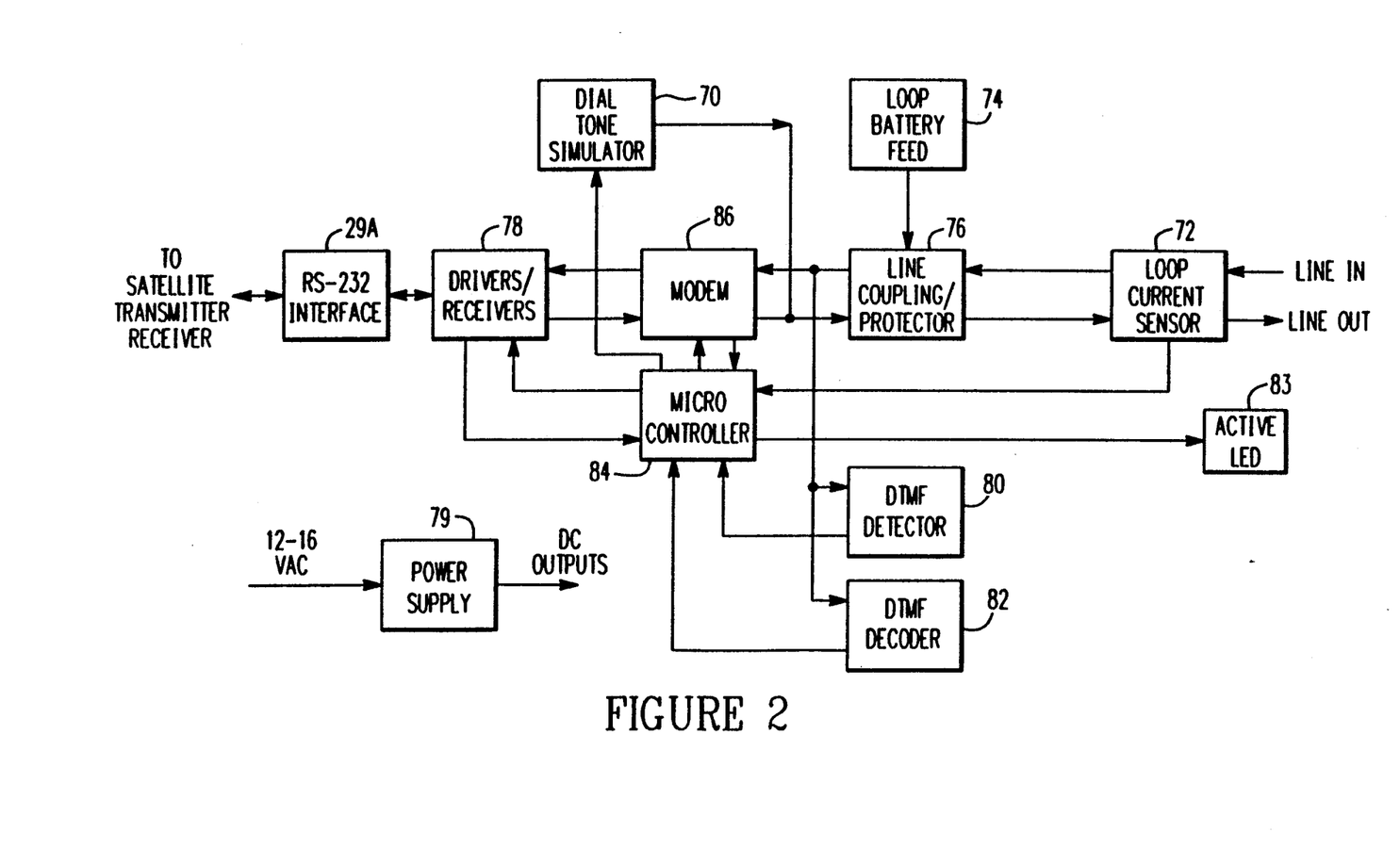
FIG. 2 shows in greater detail a functional block diagram for a modem unit employed in the WAN of FIG. 1.

The WAN modem unit 30A is shown in greater functional block detail in FIG. 2. In the preferred embodiment, a dial tone simulator 70 creates a dial tone, under microprocessor control, for application to the line 31A and connection to the card readers 12A-1 through 12A-n so that the line 31A appears to be a normal public telephone system line. As previously indicated, card readers normally require a dial tone to dial an outgoing call. When a "number" is dialed by a card reader in the preferred embodiment, there is no connection established over a public phone system to a destination on the public system. Instead, in accordance with the present invention, the dialed "number" represents the wide area network destination to which a network communication link is to be established for the card reader. Specifically, the destination to which the card reader is to be linked is the network address of the host computer for a card inserted into the card reader.

A loop current sensor 72 senses whether any transaction card reader is "off-hook", i.e., whether any reader has taken the line 31A to start dialing, and a corresponding microprocessor status input signal is generated. A loop battery feed 74 supplies −48 V to the line 31A which is the voltage level normally supplied on a public telephone system line to which a card reader would be connected in the prior art.

When dialing is initiated by a card reader, the line voltage is pulled down to flag that the line is in use. Thus, other card readers determine that the line is in use when the sensed line voltage has the pull-down value. A line coupling protector 76 is included to protect the internal modem circuitry from lightning or other voltage transients on the line 31A and to provide proper impedance to the line 31A.

Drivers/receivers 78 are operated under microprocessor control to convert signal voltage levels between the internal modem voltage levels and the external RS-232 voltage levels. A power supply 79 applies DC operating voltages to the various modem circuits.

A DTMF detector 80 detects the presence of incoming DTMF dialing tone signals on the line 31A, and a DTMF decoder 82 operates under microprocessor control to translate the received network address from DTMF code to ASCII characters for microprocessor input. When a connection is established to the network address for the designated host computer, an "active" LED 83 may display that the modem unit is connected and ready to receive.

A microcontroller 84 is coupled through input/output circuitry (not specifically shown) to the various modem unit circuits to direct the modem unit operation. The microcontroller 84 includes a microprocessor (not specifically shown) that directs data transfers and generates output control signals for modem hardware circuitry.

A modem circuit 86 becomes operative after a direct connection or link has been established to the designated host computer in accordance with processing of the network address generated by a card reader for an inserted transaction card. The modem 86 modulates data received through the RS-232 interface 29A for transmittal to the connected card reader through the line 31A. In addition, the modem 86 demodulates data received through the line 31A from the connected card reader for transmittal to the designated host computer through the RS-232 interface 29A.

Figure 5:
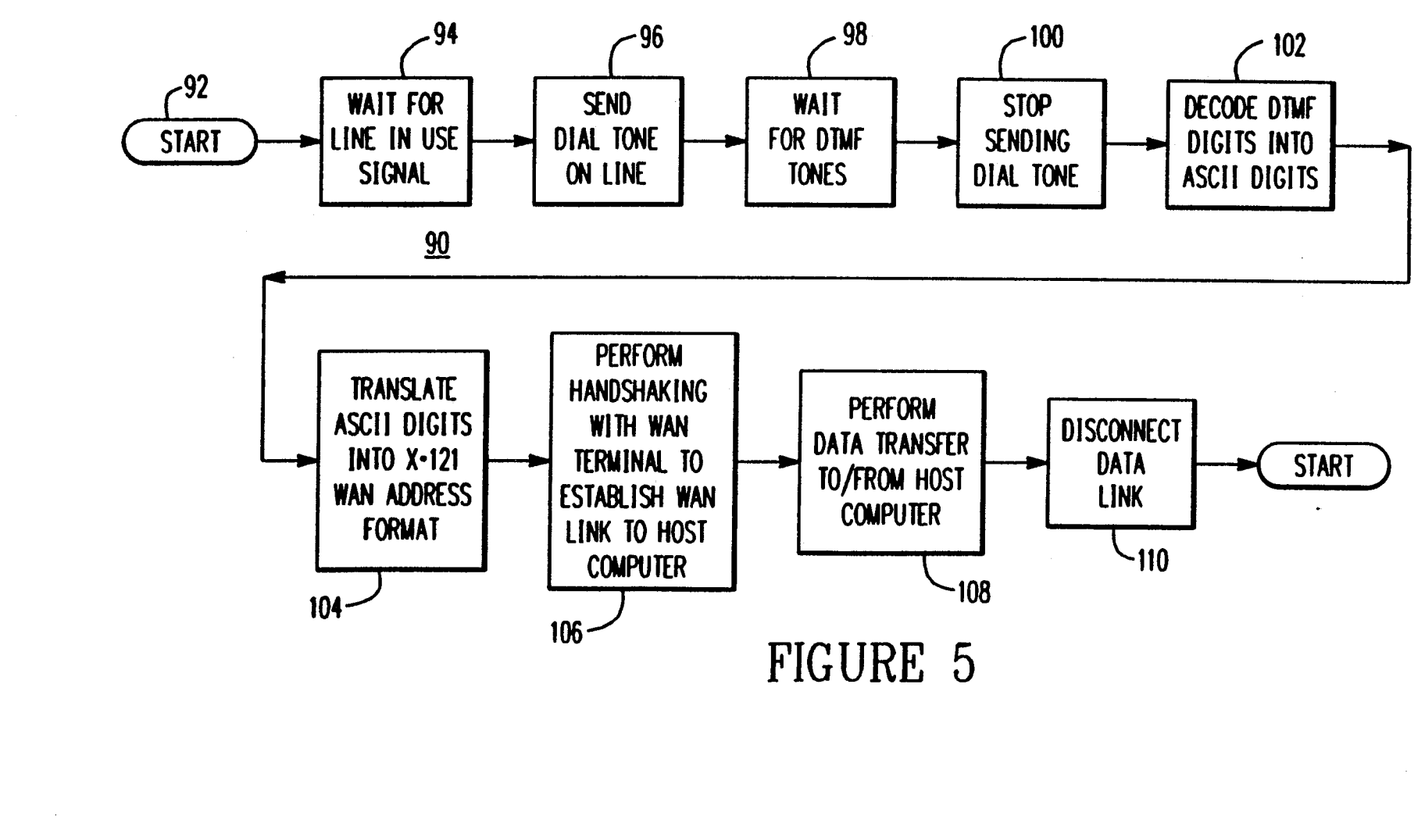
FIG. 5 shows a flow chart for a programmed procedure performed by a microprocessor in the modem unit of FIG. 2.

A programmed procedure 90 for operating the WAN modem microcontroller 84 is illustrated by a flow chart shown in FIG. 5. In effect, the procedure 90 provides an overview of the way in which the WAN modem unit 30A receives a host computer address from a card reader and processes the address to make a direct connection to the designated host computer. A "direct connection" or a "direct link" is herein meant to refer to a connection or communication link made through network switching to a host computer with no intervening host computer in the link. A host computer is a computer that provides data service for received transaction requests.

After startup in a block 92, the procedure 90 waits in a block 94 for a line in use signal from the current sensor 72 (FIG. 2). Once the line use signal is received, a block 96 preferably directs the simulator 70 to send a dial tone on the line 31A and a block 98 waits for DTMF tone signals to be received from the detector 80 and the decoder 82. The dial tone can, for example, be 440 Hz or, as preferred in the present embodiment, a combination of 350 Hz and 400 Hz.

After DTMF tones are first transmitted from on online card reader, a block 100 stops the dial tone from the simulator 70. Next, received DTMF digits are stored by the microprocessor and a block 102 decodes the DTMF digits into ASCII digits. A block 104 translates the ASCII digits into an X.121 WAN address format and an appropriate connection commmand. Generally, the number of digits received is variable, and a maximum dialed digit limit or a dialing time-out is preferably set. A limit of 15 digits is employed in the preferred embodiment.

The transaction card modem is constructed in the present embodiment to send a telephone number in Dual Tone Multi Frequency (DTMF) encoding. This coding represents each number by a combination of two audio tones, with the combination being unique to the number. Accordingly, the number can be transmitted over a channel such as a telephone line. However, the data format is not compatible with the addressing signal levels or data format requirements utilized on a WAN. Therefore, the WAN Modem decodes the DTMF numbers it receives and translates them into the required signal levels and format.

First the WAN modem decodes the number from DTMF tones to ASCII digits, which is a data representation its microprocessor can process. The microprocessor next appends any necessary network formatting characters to the digits, as required by the WAN addressing format, and transmits the address information over the WAN to cause the network to establish the desired connection.

For example, in the preferred embodiment, the WAN modem receives a variable number of address digits, usually eleven, coded in DTMF. It decodes those digits, and then transmits "CALL" followed by the decoded digits over the WAN in order to set up the desired connection.

Handshaking is performed by a block 106 with the remote satellite transmitter/receiver 28A to establish a direct WAN link to the designated host computer. After the connection is established, as indicated in block 108, transmitted data is bidirectionally processed through the modem unit 30A between the "on line" card reader and the designated host computer. Once data transfers have been completed through the requested WAN data link, a block 110 directs its disconnection.

The following represents general aspects of the handshaking procedure which can be specifically implemented in various ways depending on the specific system hardware design and depending on the nature of the call being made. Thus, an aborted transaction may call for one kind of handshaking whereas an erroneous transaction may call for another kind of handshaking. The following handshaking procedure applies to addressing as implemented in the preferred embodiment.

In the handshaking procedure, no action commences until the modem unit 30A senses that the line is in use with its loop current sensor. When it senses loop current indicating the line is in use, the modem unit 30A sends dial tone to the transaction card reader 12A. The transaction card reader then begin transmitting the numerical digits of the WAN address.

When the modem unit 30A receives the first digit, it stops transmitting dial tone to the card reader 12A.

At that time, the modem unit 30A asserts a Ring Indicator (RI) signal on the RS-232 interface 29A to indicate to the remote satellite transmitter/receiver 28A that an incoming call has been received. The transmitter 28A then asserts a Data Terminal Ready (DTR) signal on the RS-232 interface 29A to indicate that is ready to receive data.

Upon recognition of the DTR signal, the modem unit 30A asserts a Carrier Detect (CD) signal, thus activating the logical link between the modem unit 30A and the remote satellite transmitter/receiver 28A. At the time of the line activation, the modem unit 30A will also assert the Clear to Send (CTS) signal on the RS-232 interface 29A, to indicate that the transmitter 28A may send data to the modem unit 30A.

The modem unit 30A then sends to the remote satellite transmitter/receiver 28A a string of characters in an X.28-specific format. Upon reception of this command, the transmitter 28A sends the addressing data over the satellite link to the packet network 16, and waits to receive an indication from the packet network that a connection to the host computer has been established. When the remote satellite transmitter/receiver 28A receives the indication that the connection has been established, it transmits characters such as "CONNECTION ESTABLISHED" across the RS-232 interface 29A to the modem unit 30A.

When the modem unit 30A receives the "CONNECTION ESTABLISHED" signal, it establishes a data transfer connection with the transaction card reader 12A, using a standard modem interface protocol. After the data transfer connection is established, the transaction card reader 12A sends a verification transaction to the WAN modem unit 30A, which demodulates it and sends the data to the transmitter 28A.

The transmitter 28A then sends the data over the WAN to the host computer 18. The host computer then sends data back through the WAN and the transmitter/- receiver 28A, which passes it through the modem unit 30A to the transaction card reader 12A.

When the data transaction has been completed, the transaction card reader 12A goes "on-hook" making the line between it and the modem unit 30A "not in use". The modem unit then senses that condition and de-asserts the CTS signal on the RS-232 interface, which causes the transmitter 28A to disconnect the WAN connection to the packet switch network and the host computer.

OVERALL WAN OPERATION

Figure 6:
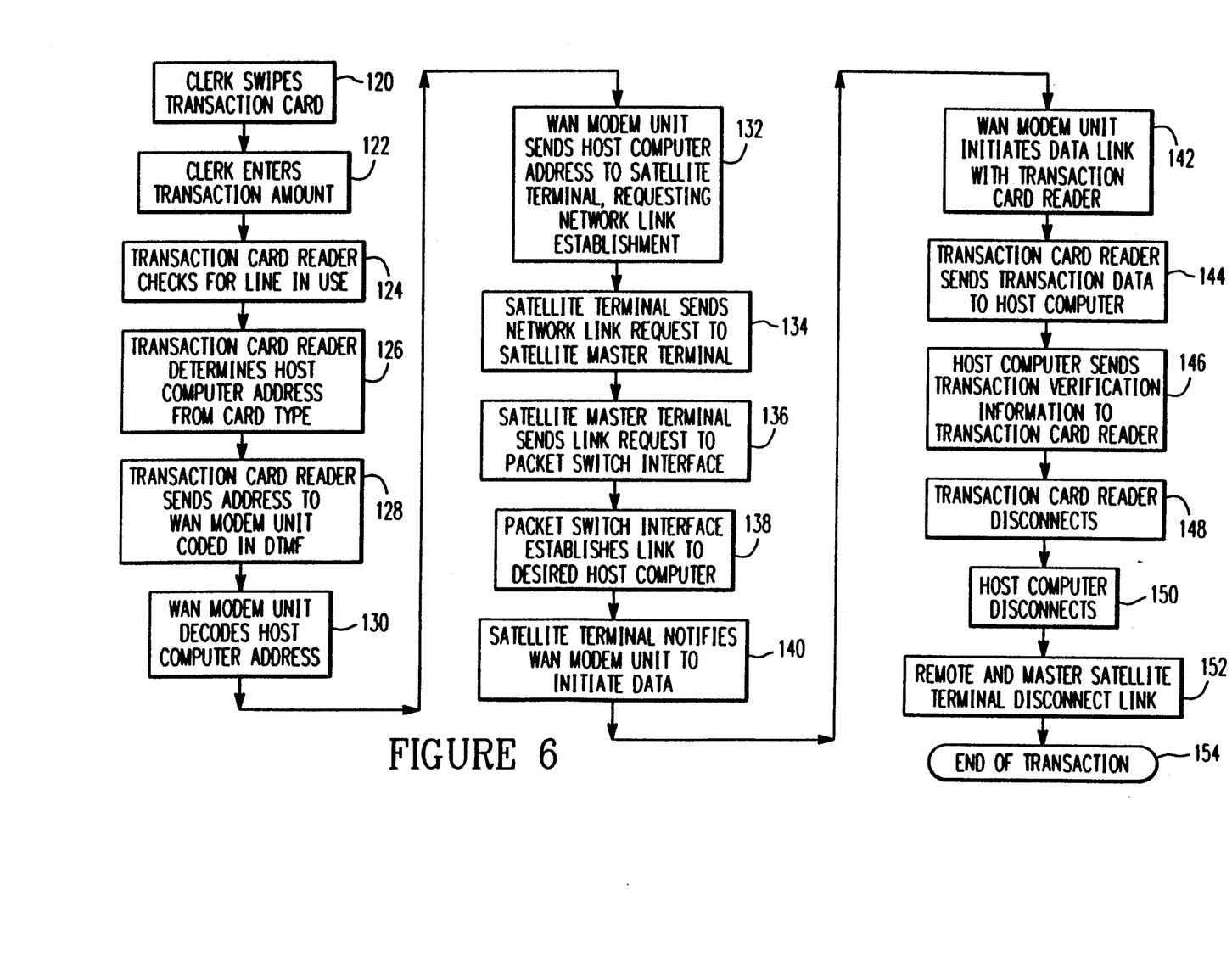
FIG. 6 shows a flow diagram for the operation of the wide area network as a whole.

The system operation of the wide area network 10 is illustrated by a master flow or process diagram shown in FIG. 6. In the exemplary application of a retail chain, a clerk first swipes a transaction card through a card reader as indicated by a block 120. The clerk next enters the transaction amount in a block 122.

In blocks 124 and 126, the transaction card reader checks for use of the line 31A (FIG. 1) and determines the host computer address from the inserted transaction card. Next, in a block 128, the card reader sends the host computer address to the WAN modem unit 30A.

In the WAN modem unit 30A, the address received from the card reader is decoded in block 130 and sent by block 132 to the satellite terminal 28A. In a block 134, the satellite terminal 26 sends the network link request to the satellite master terminal 26 which, as indicated by a block 136, forwards the request to the packet switch interface 14.

In a block 138, the packet switch network 16 establishes the requested direct link to the designated host computer. The satellite terminal 28A detects the established host computer connection and notifies the WAN modem unit 30A to initiate data as indicated by a block 140.

The WAN modem unit 30A then initiates a data link with the requesting card reader as indicated by a block 142. In a block 144, the card reader sends transaction data to the host computer, and in turn, the host computer sends verification information to the card reader in block 146.

The interconnected card reader and host computer then disconnect as indicated by blocks 148 and 150. Finally, the remote and master satellite terminals disconnect the direct data link in a block 152, and the transaction is ended in a block 154. The system then stands ready for the next request from a card reader for a direct link to an addressed host computer.

The foregoing description of the preferred embodiment has been presented to illustrate the invention and its operation in either terrestial or satellite wide area networks. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A wide area communication network comprising:
   a central network for establishing a data link to any one of a plurality of host computers each of which has resident data related to remote data service requests, the central network having a central satellite transmitter/receiver;
   at least one remote network terminal having a plurality of data terminals for initiating data service requests and a remote satellite transmitter/receiver for communicating with the central satellite transmitter/receiver of the central network via a satellite link with an orbiting communications satellite;
   each of said data terminals having a detector for detecting the identity of one host computer of said plurality of host computers from a data service request and for generating an output data signal representing an address of the corresponding identified one of said plurality of host computers;
   a circuit in communication with said data terminals for receiving host computer address signals from said data terminals and for directing a representation of a received host computer address signal through said satellite link to said central network to establish a data flow connection between said respective data terminal and the addressed host computer;
   said circuit further having a modem, said modem having a demodulator for demodulating data being sent from said respective data terminal to said addressed host computer through said satellite link and said central network after said data flow connection is established;
   said modem additionally having a modulator for modulating data being sent from said addressed host computer through said central network and said satellite link to said respective data terminal after said data flow connection is established; and
   a microprocessor, wherein said modem includes means for applying said host computer address signals received from said data terminals and said microprocessor includes means for translating a received host computer address signal to a network address format of said satellite link.

2. The wide area communication network of claim 1 wherein at least some of said data terminals are point-of-sale terminals.

3. The wide area communication network of claim 2 wherein said point-of-sale terminals comprise transaction card readers.

4. The wide area communication network of claim 3 wherein said host computer address signals comprise transaction card type and account number data in the form of dual tone multi frequency signals.

5. The wide area communication network of claim 2 wherein each of said point-of-sale terminals includes means for transmitting to said circuit digit signals representing the host computer address.

6. The wide area communication network of claim 5 wherein said digit signals represent a telephone number that represents the host computer address and said circuit translates the telephone number to the host computer address.

7. The wide area communication network of claim 5 wherein said digit signals directly represent the host computer address.

8. The wide area communication network of claim 1 wherein said data terminals are adapted for coupling to a public telephone service, said wide area communication network further comprising:
   a wire connection between said circuit and said data terminals; and
   said circuit having means for simulating a public telephone service line to said data terminals using said wire connection.

9. The wide area communication network of claim 8 wherein said simulating means includes means for applying a telephone service line voltage to said wire connection and for generating a dial tone on said wire connection.

10. The wide area communication network of claim 1 wherein said circuit includes means for translating each received computer address to a network address format employed for the wide area network.

11. The wide area communication network of claim 1 wherein each of said data terminals includes means for transmitting, to said circuit, digital signals representing a host computer address and wherein said circuit includes means for translating each received host computer address to a network address format employed for said satellite link.

12. The wide area communication network of claim 11 wherein said digit signals directly represent the host computer address.

13. The wide area communication network of claim 11 wherein said digit signals represent a telephone number that represents the host computer address and said circuit translates the telephone number to the host computer address.

14. A subsystem in a wide area network for coupling remote data transactions to a central network to establish a data link to any one of a plurality of host computers each of which has resident data related to particular remote data transactions, said subsystem comprising:
  a plurality of data terminals adapted for initiating data service requests through a public telephone service line, each of said data terminals having means for detecting the identify of one host computer of said plurality of host computers from an input data service request and for generating an output data signal representing a host computer address;
  a circuit for receiving host computer address signals from said data terminals and for generating a representation of a received host computer address signal to establish a network link through the central network to the addressed host computer;
  means for simulating a public telephone service line to said data terminals and for coupling said data terminals and said circuit for data flow therebetween;
  said circuit further having a demodulator for demodulating data being sent from a connected data terminal to the addressed host computer through said central network after the network link is established; and
  said circuit additionally having a modulator for modulating data being sent from the addressed host computer through said central network to the connected data terminal after the network link is established.

15. The subsystem of claim 14 wherein at least some of said data terminals are point-of-sale terminals.

16. The subsystem of claim 14 wherein:
  said coupling means includes a wire connection; and
  said simulating means includes means for applying a telephone service line voltage to said wire connection and for generating a dial tone on said wire connection.

17. The subsystem of claim 14 wherein each of said data terminals includes means for transmitting to said circuit digit signals representing the host computer address.

18. The subsystem of claim 14 wherein said circuit includes means for translating each received host computer address to a network address format employed for the wide area network.

19. The subsystem of claim 14 wherein each of said data terminals includes means for transmitting to said circuit means digit signals representing the host computer address and wherein said circuit includes means for translating each received host computer address to a network address format employed for the wide area network.

20. The subsystem of claim 19 wherein said digit signals directly represent the host computer address.

21. The subsystem of claim 14 wherein said circuit includes a modem unit having a modem for demodulating card data from the data terminals and for modulating host computer data being sent to the data terminals, and a microprocessor for operating said modem and said modem unit.

22. The subsystem of claim 21 wherein each of said data terminals includes means for transmitting to said circuit digit signals representing the host computer address, said modem unit includes means for applying received address digit signals to said microprocessor, and said microprocessor includes means for translating each received computer address to a network address format employed for the wide area network.

23. A method for operating a wide area communication network, the steps of said method comprising:
  operating a central network which has a central satellite transmitter/receiver to establish a data link to any of multiple host computers each of which has resident data related to particular remote data service requests received at the transmitter/receiver;
  operating at least one remote network terminal having a plurality of data terminals for initiating data service requests and a remote satellite transmitter/receiver for communicating with the central satellite transmitter/receiver via a satellite link with an orbiting communications satellite;
  detecting at the data terminals the identity of any of said multiple host computers from input data service requests initiated at the corresponding data terminal and generating output data signals representing addresses to said host computers for which an identity has been detected;
  operating a circuit to receive host computer address signals from the data terminals and to direct representations of received host computer address signals to the central network via the satellite transmitter/receiver to establish a direct network link to the addressed host computer;
  demodulating data being sent from a connected data terminal to the addressed host computer through the central network after the direct network link is established; and
  modulating data being sent from the addressed host computer through the central network to the connected data terminal after the direct network link is established.

24. The method of claim 23 wherein the step of detecting the identity of host computers further comprises the steps of:
  operating the data terminals to receive magnetic input data from inserted credit and other transaction cards; and
  determining the host computer addresses from the magnetic input data.

25. A method for communicating over a wide area network comprising:

receiving an input data service request from a data terminal at a remote network terminal, the request including a host computer identification;

detecting the host computer identification and generating a host computer address therefrom;

transmitting the input data service request and the host computer address from the remote network terminal to a central network via an orbiting satellite using a remote network satellite transmitter/receiver and a central network satellite transmitter/receiver;

further transmitting the input data service request via the central network to a host computer corresponding to the host computer address and establishing a satellite link between the remote network terminal and the host computer.

26. The method of claim 25 wherein the step of detecting the host computer identification comprises detecting the host computer identification at the remote network terminal.

27. The method of claim 25 further including the step of simulating a public telephone service line to the data terminal at the remote network terminal.

28. The method of claim 27 wherein the step of simulating a public telephone service line comprises applying a telephone service line voltage to the data terminal.

29. The method of claim 27 wherein the step of simulating a public telephone service line comprises applying a dial tone to the data terminal upon receipt of an off hook signal from the data terminal.

30. The method of claim 25 wherein the step of receiving an input data service request comprises receiving the host computer identification as digits of a telephone number and the step of generating a host computer address comprises translating the telephone number digits into a host computer address.

31. The method of claim 30 wherein the step of receiving an input data service request comprises receiving the host computer identification as DTMF (Dual Tone Multi Frequency) tones of a telephone number and the step of generating a host computer address comprises decoding the DTMF tones into respective numerical digits.

32. The method of claim 25 wherein the step of receiving an input data service request comprises receiving an input data service request from a point-of-sale terminal.

33. The method of claim 25 further including the steps of:

demodulating data sent from the data terminal to the host computer through said satellite link; and modulating data sent from the host computer to the data terminal through said satellite link.

34. The method of claim 33 wherein the step of demodulating data comprises decoding data received as DTMF (Dual Tone Multi Frequency) tones into digital data and the step of modulating data comprises encoding data received as digital data into DTMF tones.

* * * * *